United States Patent
Verosto et al.

(10) Patent No.: US 7,163,107 B1
(45) Date of Patent: Jan. 16, 2007

(54) OIL/WATER SEPARATOR WITH ENHANCED IN-SITU CLEANING

(75) Inventors: Stephan J. Verosto, Knoxville, MD (US); Mario DiValentin, Alexandria, VA (US); David O. Ferchau, Mount Laurel, NJ (US); Michael Honan, Gig Harbor, WA (US); J. William Citino, III, Mount Laurel, NJ (US); David E. Freshcoln, Pitman, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 49 days.

(21) Appl. No.: 10/975,114

(22) Filed: Oct. 28, 2004

(51) Int. Cl.
*B01D 17/028* (2006.01)

(52) U.S. Cl. ...................... 210/521; 210/540
(58) Field of Classification Search ................ 210/521, 210/522, 538, 540, 802
See application file for complete search history.

(56) References Cited

U.S. PATENT DOCUMENTS

| | | | | |
|---|---|---|---|---|
| 2,573,615 A | * | 10/1951 | Seailles | 210/521 |
| 3,788,981 A | * | 1/1974 | Richard et al. | 210/521 |
| 3,903,000 A | * | 9/1975 | Miura et al. | 210/522 |
| 3,975,276 A | * | 8/1976 | Schmid | 210/521 |
| 4,045,344 A | * | 8/1977 | Yokota | 210/521 |
| 4,156,644 A | * | 5/1979 | Richard | 210/802 |
| 5,089,136 A | * | 2/1992 | Cyr | 210/521 |
| 5,228,983 A | * | 7/1993 | Nims | 210/540 |
| 5,326,474 A | * | 7/1994 | Adams et al. | 210/522 |
| 5,536,409 A | * | 7/1996 | Dunkers | 210/521 |
| 5,605,636 A | * | 2/1997 | Wyness | 210/521 |
| 6,605,224 B1 | * | 8/2003 | Aymong | 210/538 |
| 6,659,290 B1 | | 12/2003 | Lawson et al. | |

* cited by examiner

*Primary Examiner*—Christopher Upton
(74) *Attorney, Agent, or Firm*—Jacob Shuster

(57) ABSTRACT

In-situ cleaning of the bilgewater processing plates of stacks within a treatment tank chamber of a 50-gpm oil/water separator is performed by an injected chemical cleaning agent dispersed by diverted flow of pressurized air introduced into the tank chamber below the plate stacks by emergence of air bubbles from plural branches of an air sparging array system positioned in underlying alignment with crest formations on the processing plates. The air sparging array system consists of an upper and lower tank arrays.

7 Claims, 6 Drawing Sheets

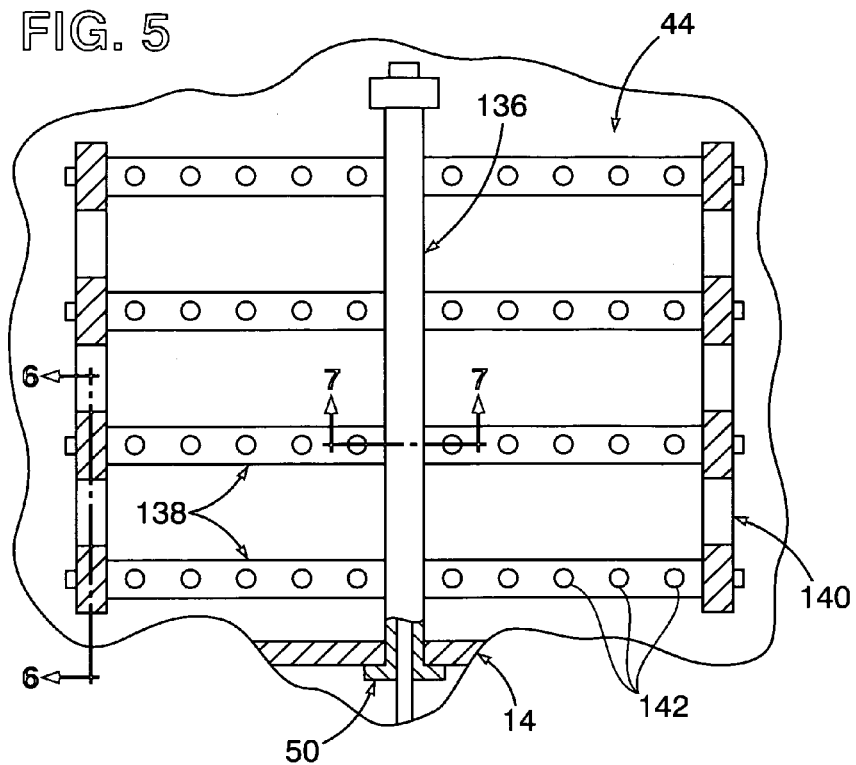
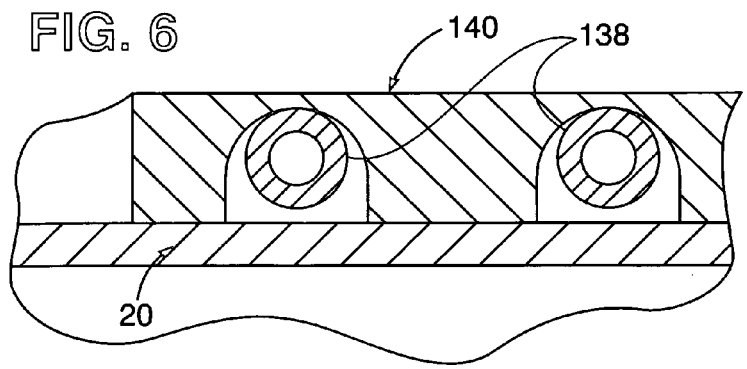
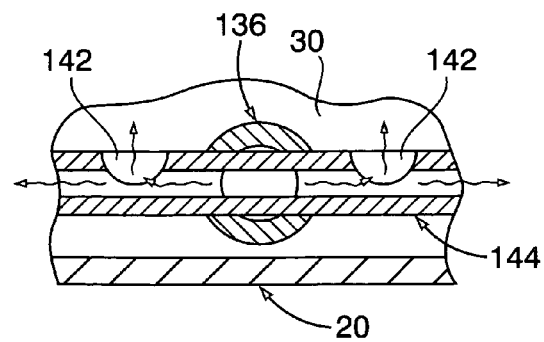

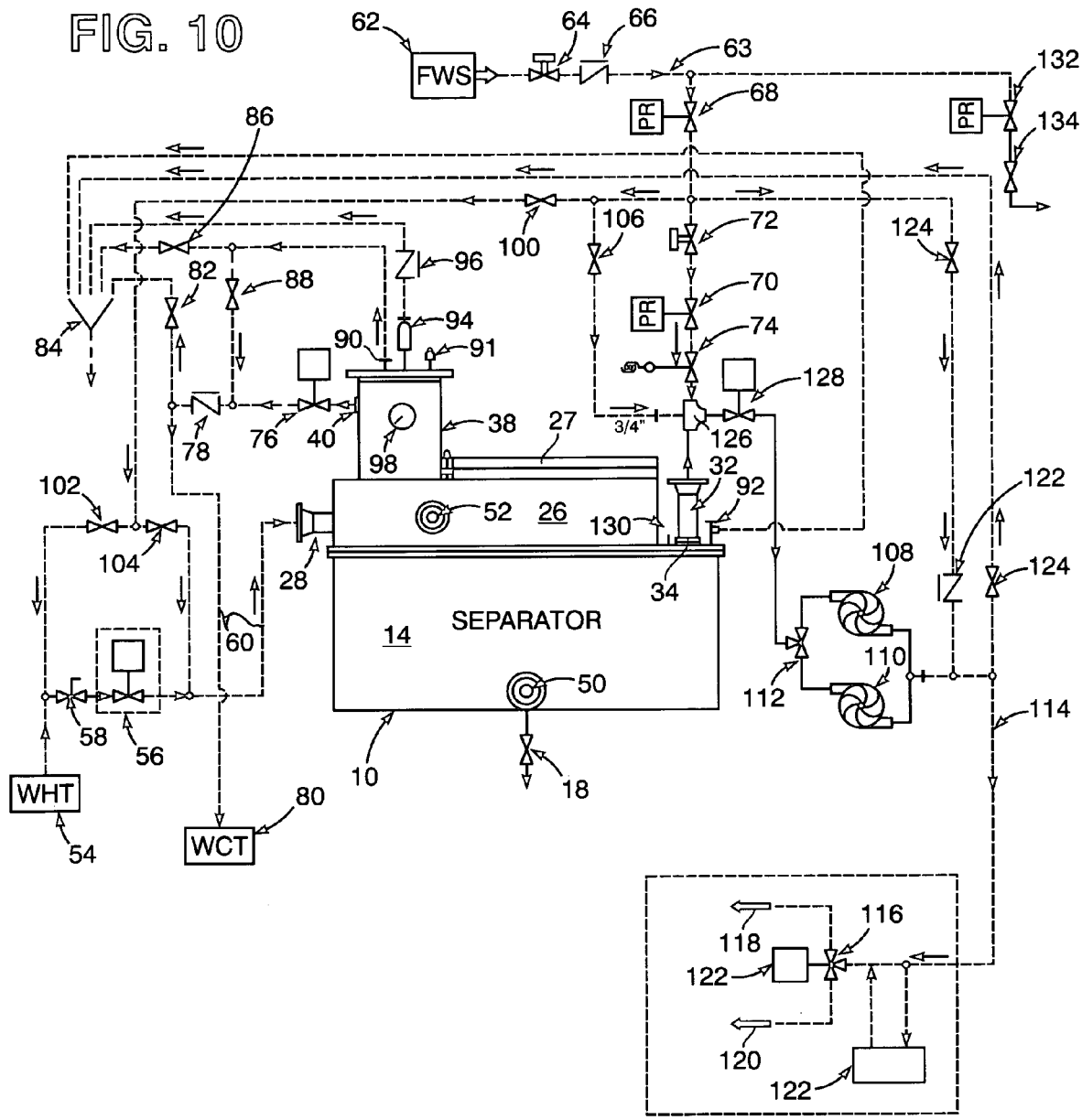

OIL/WATER SEPARATOR WITH ENHANCED IN-SITU CLEANING

The present invention relates generally to an oil/water separator with enhanced installational and operational facilities.

STATEMENT OF GOVERNMENT INTEREST

The invention described herein may be manufactured and used by or for the Government of the United States of America for governmental purposes without the payment of any loyalties thereon or therefore.

BACKGROUND OF THE INVENTION

Oil/water separators with in-situ cleaning of the oil separating plate stacks therein are now generally known in the art as disclosed for example in U.S. Pat. No. 6,659,290 B1 to Lawson et al. Current procedures for separator cleaning and for maintenance thereof are labor-intensive and also involve exposure of personnel to waste oil and cleansing chemicals utilized. Furthermore such oil/water separators involve separation limited to small quantities of oil such as 10-gallons per minute (gpm). It is therefore an important object of the present invention to provide an arrangement for the foregoing type of oil/water separator which will avoid the aforementioned disadvantages associated therewith, such as small quantity of oil separation.

SUMMARY OF THE INVENTION

Pursuant to the present invention, the oil/water separator features separate lower and upper tank chamber sections that are readily assembled and disassembled from each other for installation and replacement of oil separating plate stacks that are respectively positioned within the lower and upper tank sections in overlying relation to in-situ cleaning air sparging arrays therein. A valve control piping system is fixedly positioned on top of the upper tank section of the separator, together with the oil tower within which separated oil is collected and withdrawn for drainage into a waste oil storage tank under computer programmed control of electrically driven valves in the piping system which is also provided with manually controlled valves for selective operational conditioning of the separator. Valve controlled facilities are also provided by the valve control piping system for fresh water clean-up, wastewater treatment and wastewater overboard discharge. Oil separation quantities are accordingly enlarged while in-situ cleaning of the plate stacks is enhanced.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 5 is a partial section view taken substantially through a plane indicated by section line 5—5 in FIG. 4;

FIGS. 6 and 7 are partial section views taken substantially through planes respectively indicated by sections lines 6—6 and 7—7 in FIG. 5;

FIG. 10 is a schematic diagram of the oil/water separator shown in FIGS. 1–9, with the valve piping diagrammed in detail.

DETAILED DESCRIPTION OF PREFERRED EMBODIMENT

Figure 2:
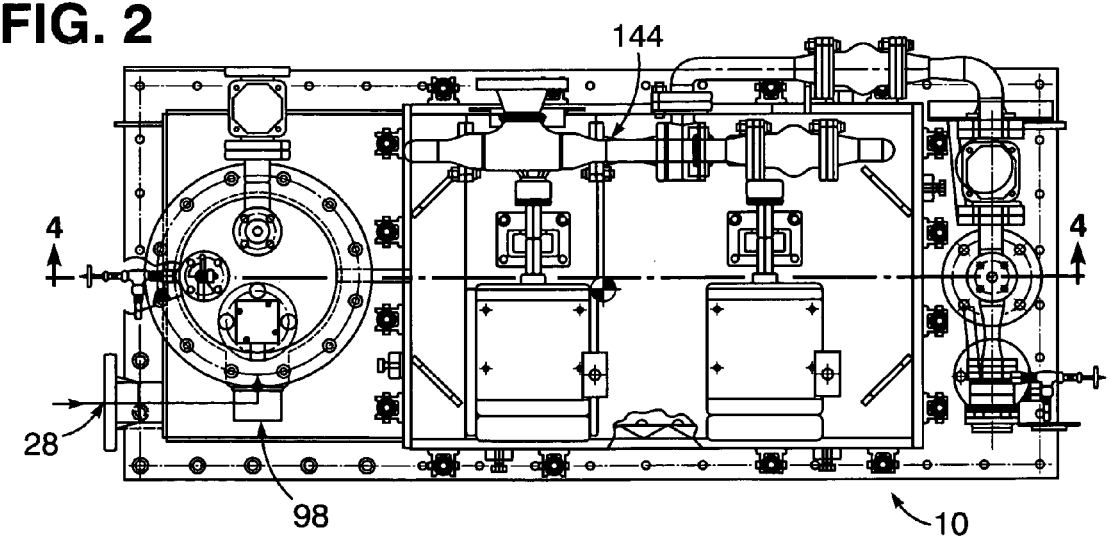
FIG. 2 is a top plan view of the oil/water separator illustrated in FIG. 1.
Figure 3:
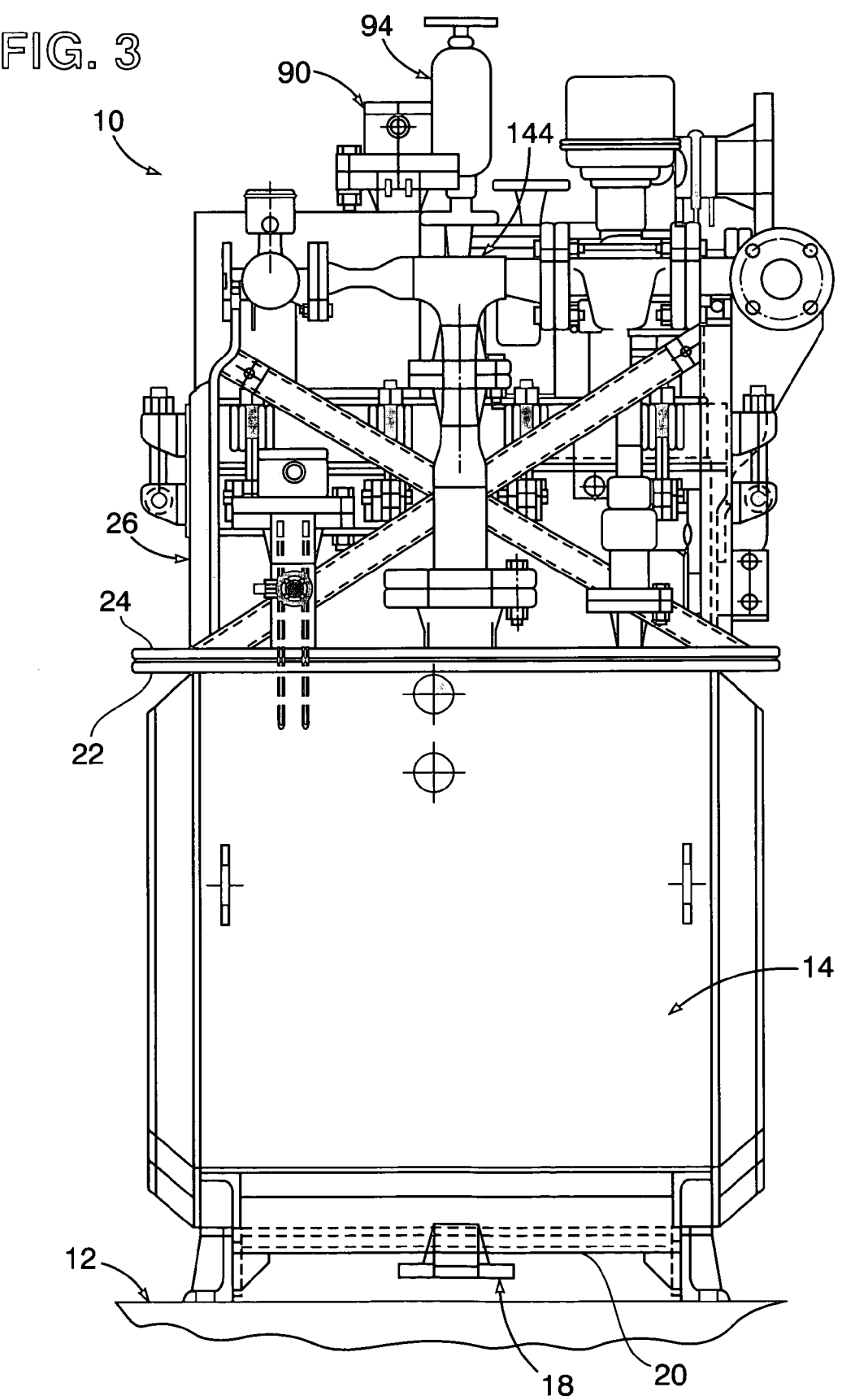
FIG. 3 is an end elevation view of the oil/water separator shown in FIGS. 1 and 2.
Figure 4:
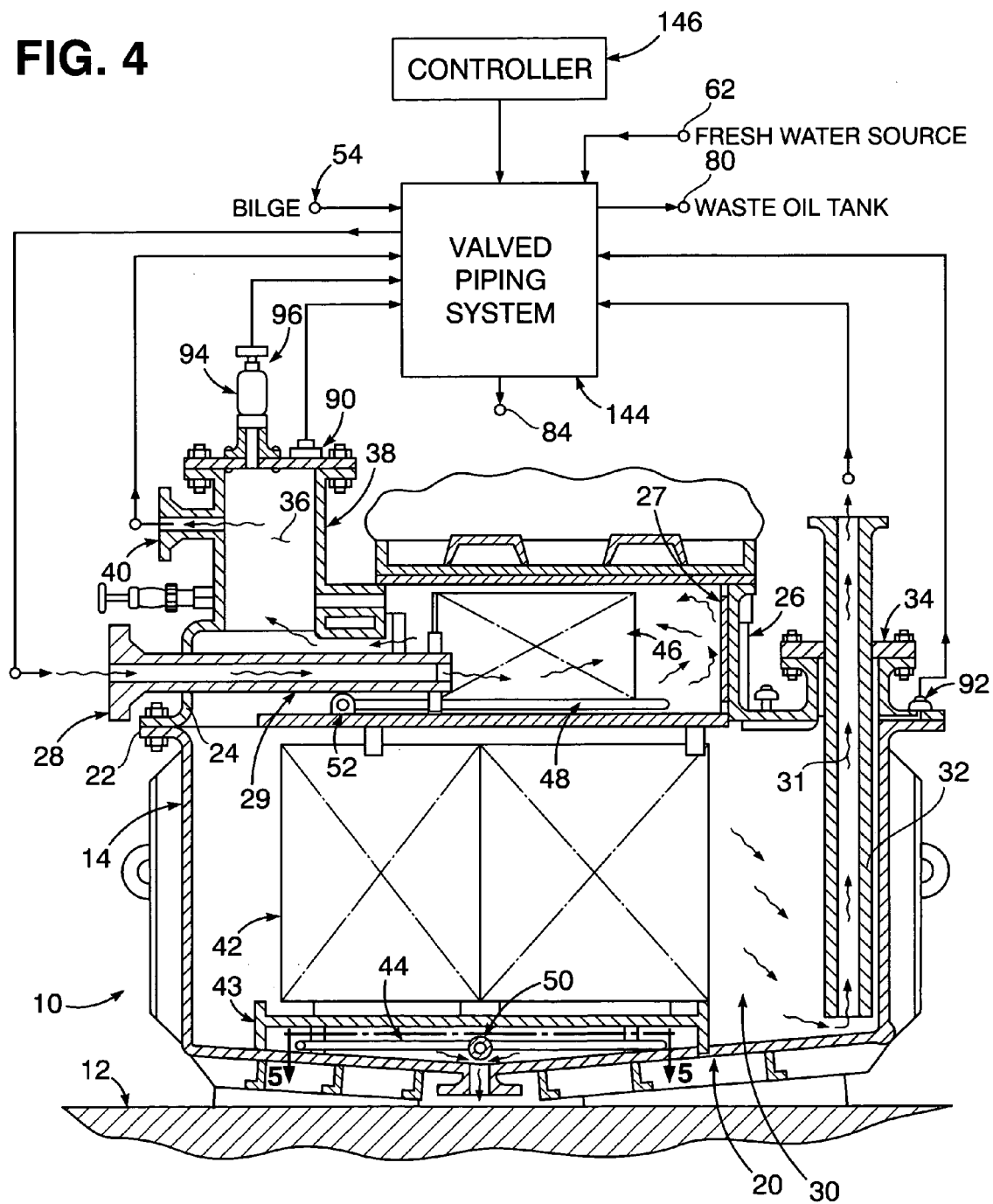
FIG. 4 is a partial section view taken substantially through a plane indicated by section line 4—4 in FIG. 2, with diagrammatic illustration of valve piping portions of the oil/water separator.
Figure 8:
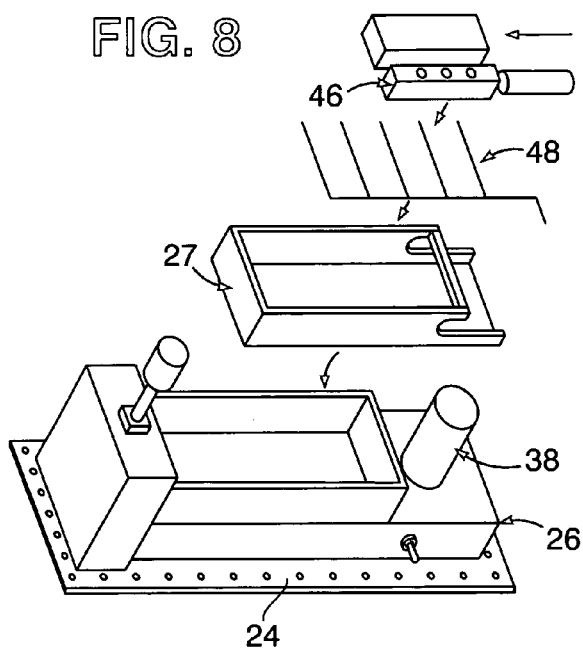
FIGS. 8 and 9 are perspective views respectively illustrating disassembled upper and lower tank sections of the oil/water separator illustrated in FIGS. 1–7.
Figure 9:
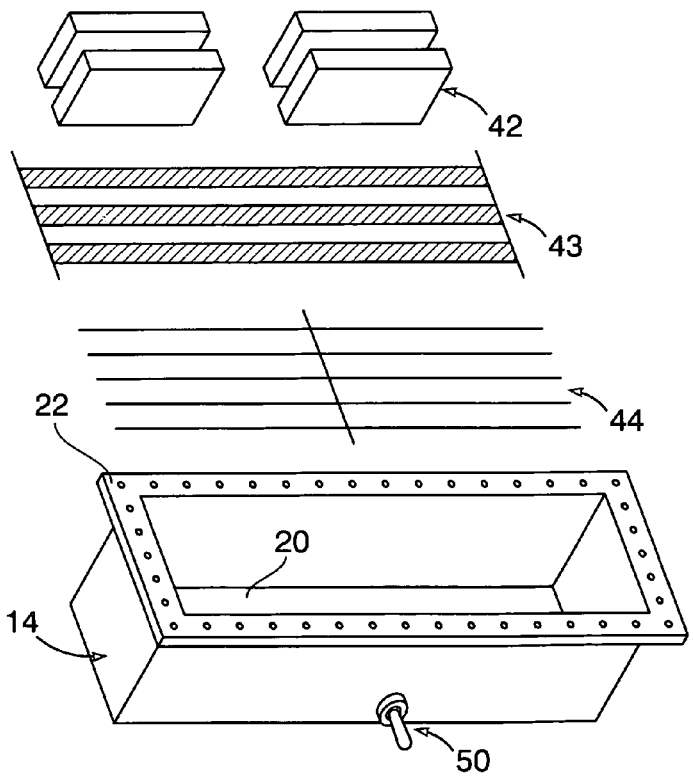

Referring now to the drawing in detail, FIGS. 1–4 illustrate an oil/water separator 10 with which the subject invention is associated as hereinafter explained. The separator 10 is shown positioned at a suitable location on a support surface 12, within a sea vessel such as a U.S. Naval ship, for in-situ separation therein of oil from an oily wastewater bilge such as seawater. The separator 10 is provided with a cross-sectionally rectangular lower tank chamber section 14 attached to the surface 12 by leg structure assemblies 16, between which a drain fitting 18 extends from a bottom 20 of the lower tank section 14. A gasket flange 22 is connected to and extends peripherally from a top of the lower tank section 14, to which a corresponding flange 24 of an upper tank chamber section 26 is removably attached. An oil/water inlet fitting 28 from which an inlet tube 29 extends is positioned within the upper tank section 26 above the lower tank section 14, through which the wastewater bilge is introduced into a separator chamber 30 enclosed within the lower and upper tank sections 14 and 26 as shown in FIG. 4. After the wastewater undergoes a separation cleansing process by sequential treatment within the tank chamber 30 as hereinafter explained. A cleansed water effluent 31 emerges from the lower tank section 14 adjacent an end thereof opposite the inlet fitting 28 by upward outflow thereof through an outlet pipe 32 extending through an outlet fitting 34 on top of the lower tank section 14 adjacent one end thereof. Separated oil 36 on the other hand emerges by outflow through an oil tower 38 positioned on top of the separator 10 adjacent the open end thereof into an oil outlet fitting 40 connected thereto.

As illustrated in FIG. 4, the oily wastewater separation process is performed within the lower tank section 14 by two pair of separation treating plate packs 42 positioned within the lower tank section 14 of the separator chamber 30 by a support bracket 43 located above an underlying lower air sparge array 44 on the bottom 20 of the lower tank section 14. A coalescing plate pack 46 is positioned within the upper tank section 26 by an upper tray 27 on which an air sparge array 48 is supported for separation treatment of the oily wastewater before it again undergoes treatment within the lower tank section 14 by the plate packs 42. The lower and upper air sparge arrays 44 and 48 are respectively connected to manifold fittings 50 and 52 extending from one lateral side of the separator 10, as diagrammed in FIG. 7, for supply of low pressure air thereto to effect in-situ cleaning of the oil separating plate packs 42 and 46.

Installation of the separator 10 as hereinbefore described is facilitated by assembly involving attachment of the lower tank section 14 to the upper tank section 26 as shown in FIGS. 5 and 6. When the separator is disassembled as shown in FIG. 5, the air sparge array 44, the support bracket 43 and the four plate packs 42 may be sequentially positioned into the lower tank section 14. The upper tank section 26 may then be attached to the lower tank section 14, followed by sequential insertion of the upper tank tray 27, the upper air sparge array 48 and the upper plate pack 46.

Also directly mounted on top of the lower tank section 14 of the assembled separator 10 adjacent the effluent outflow pipe 34 is an oil flood level sensor 130. Aside from the components directly mounted on the separator 10 as indicated in FIG. 7 valve piping components as diagrammed in FIG. 7 may also be directly mounted on top of the separator 10 as illustrated in FIGS. 1, 2 and 3.

The waste bilge such as seawater from a source 54 as diagrammed in FIG. 7, is introduced into the separator 10 through the inlet fitting 28, at one end face on the separator 10, by influent piping which includes an automatically driven check valve 56 connected in series with a manually operated ball valve 58, so as to control the inflow of the waste bilge into the separator fitting 28 within an influent line 60. When the valve 58 is selectively opened to condition the separator 10 for normal automatic operation, the wastewater influent is pulled into the separator inlet fitting 28 through the check valve 56 until the separator 10 is initially filled. The valve 56 then closes while separated oil within the separator 10 is discharged from the outlet fitting 40 on the oil tower 38 to prevent backflow through the influent line 60.

A fire main water supply 62 is connected to a fresh water line 63 through a manually operated valve 64 and a check valve 66 for selectively controlled inflow of fresh water from the supply 62. The fresh water line 63 is connected to pressure reducing regulator valves 68 and 70 in series with another manual valve 72 therebetween for supply of the fresh water under a pressure of less than 125 psi to a solenoid operated fresh water input valve 74. Under selective control of the input valve 74, the fresh water is introduced into the separator 10 as hereinafter pointed out. An automatically operated discharge valve 76 is connected to the oil outlet fitting 40 on the oil tower 38 for discharge of separated oil conducted by piping through a check valve 78 into a oil/water holding tank 80. The piping into the tank 80 is also connected to a manually operated valve 82 for selective controlled outflow into an overboard drain 84. Also overboard effluent discharge into the drain 84 and the holding tank 80 is selectively effected through a manually operated valve 86, connected to an effluent outlet fitting 90 on top of the separator oil tower 38. A sensor 91 is mounted on the top of the oil tower 38 to monitor oil/water level therein so as to indicate when fill/back-flush outflow from the outlet fitting 90 should be conducted through the check valve 78 to the holding tank 80 by opening of a manual valve 88.

Figure 1:
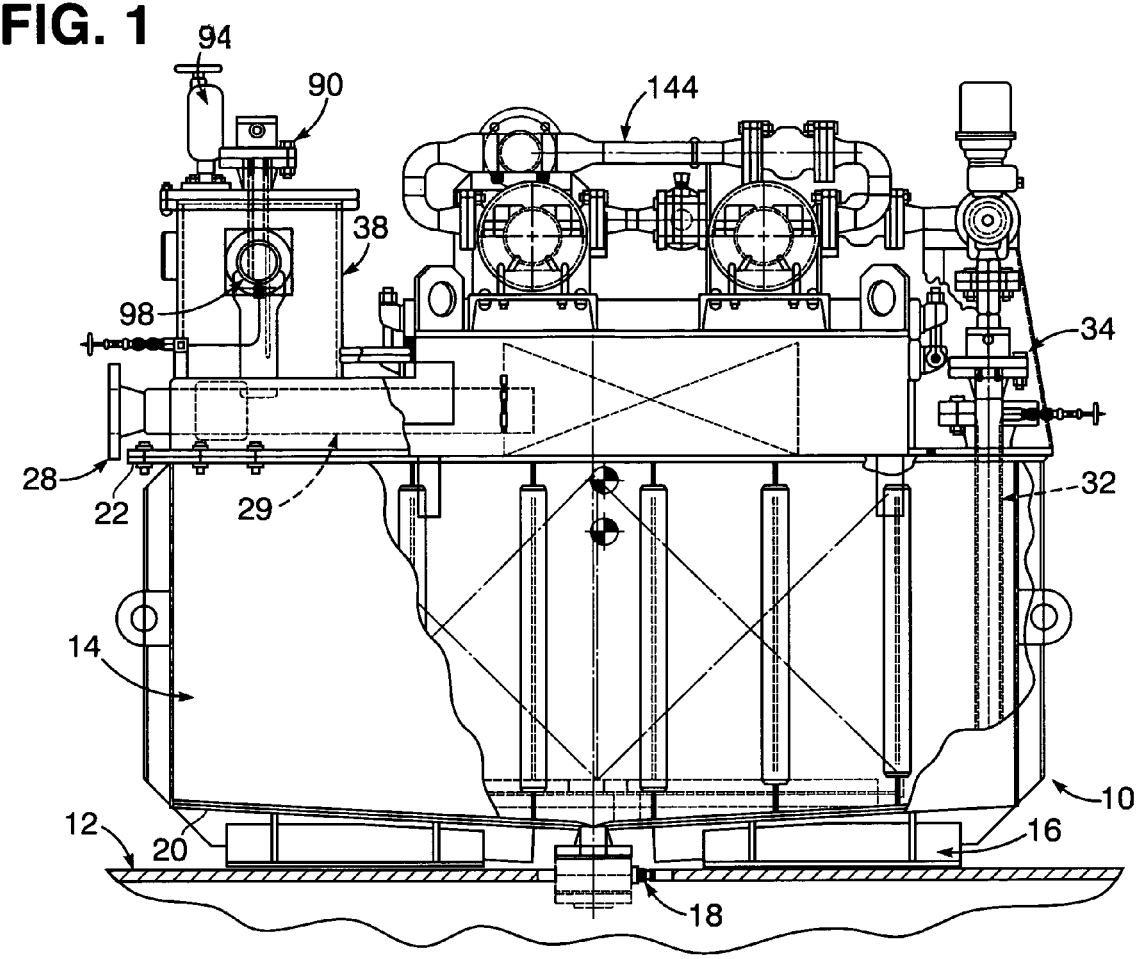
FIG. 1 is a side elevation view of an installed oil/water separator in accordance with one embodiment of the present invention.

The top of the oil tower 38 also mounts an air eliminator 94 with a check valve 96 positioned thereon and connected to the drain 84 so as to prevent air from entering the separator 10 through the air eliminator 94 while the separator 10 is operating under a vacuum condition therein, as reflected by a vacuum pressure gauge 98 mounted on the side of the oil tower 38 as shown in FIGS. 1, 2 and 7.

The manual valve 72 through which the fresh water is conducted to the solenoid operated fresh water valve 74 as hereinbefore described, may be closed to shut off inflow of the fresh water when maintenance of the pressure regulator valve 70 is being performed. Fresh water from the other pressure regulator valve 68 may be conducted through a manual valve 100, when opened to a pair of manual valves 102 and 104, for supply of the fresh water to the automatically driven check valve 56 operatively connected to the separator inlet fitting 28 and the waste water source 54. A manual valve 106 is connected to the fresh water input to the manual valve 100 for selectively controlled tank filling or back-flush of the separator 10 as hereinafter explained.

A pair of pumps 108 and 110 are connected to a 3-way manual inflow valve 112 to which fresh water effluent is supplied for pressurized outflow into pump discharge piping 114, connected to a 3-way valve 116 for overboard discharge 118 or effluent treatment 120 in accordance with the condition of the effluent in the discharge piping 114 as reflected by an indicator 122. In order to back-flush the pump discharge piping 114, fresh water from the pressure regulator 68 is fed through a manual valve 124 when opened and a check valve 126 into the pump discharge piping 114. The water effluent in the pump discharge piping 114 may be sampled by opening of a manual valve 124 connected to the drain 84.

The clean effluent outflow pipe 34, extending from the top of the lower tank section 14, is connected through a pipe intersecting section 126 to an automatic effluent outflow valve 128 through which the effluent is supplied to the pumps 108 and 110 through the inflow valve 112, from the fresh water source 62 through the solenoid valve 74 or from the valve 106 connected to the pipe intersecting section 126.

The manual valves 88 and 86 are selectively opened and closed for fill or back-flush routed outflow from the oil tower fitting 90 into (a) oil discharge through the check valve 78, and (b) into the drain 84. The manual valve 82 when opened routs discharge outflow from the check valve 78 into the drain 84. The fresh water line 63 is also connected through a pressure regulator valve 132 to a manual valve 134 through which fresh water outflow for clean up of the separator 10 and the components mounted thereon or associated therewith is performed. Finally, a pressure relief valve 92 on the top of the lower tank section 14 limits the pressure therein by outflow of fluid therefrom into the drain 84.

The structural arrangement of the air sparge arrays 44 and 48 is shown in FIGS. 5, 6 and 7. The lower air sparge array 44 by way of example features a centrally located tube 136 to which the air manifold fitting 50 is connected at one axial end opposite the closed axial end. A plurality, preferably four parallel spaced tubes 138 are connected to the central tube 136 and extend laterally therefrom onto supports 140 positioned on the bottom 20 of the lower tank section 14 underlying the support bracket 43. A plurality of outlet openings 142 are formed on the tops of the tubes 138 for spray ejection of pressurized air onto the lower plate packs 42 during a in-situ clearing operation under supply of the pressurized air into the manifold fitting 50. During such cleaning operation the pressurized air also enters the manifold fitting 52 into the upper air sparge array 48 for cleansing of the upper plate pack 46.

It will be apparent from the foregoing description that the oil/water separation process associated with the separator 10 involves a piping system 144 as diagrammed in FIG. 4, through which inflow of wastewater from the bilge source 54 into the inlet fitting 28 occurs and inflow of fresh water from the supply 62 is received. The piping system 144 embodies all of the manually operated valves 58, 64, 72, 82, 86, 88, 102, 104, 112, 124 and 134 hereinbefore referred to, through which the separator 10 is conditioned for automatic controlled operation under control of the aforementioned valves 56, 74, 76 122 and 128, by a valve controller 146 as diagrammed in FIG. 4. The manual valve 82 and the automatically controlled check valve 56 of the piping system 144 are connected to the inlet fitting 28 of the separator 10 as hereinbefore referred to. The oil outlet fitting 40 of the separator 10 is connected to the automatically controlled valve 76, while the oil tower fitting 90 is connected to the manually operated valves 86 and 88 of the piping system 144. The air eliminator 94 on the oil tower 38 is connected to the aforementioned check valve 96 also associated with the piping system 144, while the separator outlet pipe 32 is connected to the pipe section 126. The fresh water source 62 as diagrammed in FIG. 4 is connected to the manually controlled valve 64 in the piping system 144 which also connects the drain 84 to the pressure relief valve 92.

Heretofore, cleaning of plate packs were periodically performed by personnel after removal from a upper tray/tank and a lower tank. Such removal and outside cleansing of the plate pack stacks is avoided, pursuant to the present invention, by its in-situ cleansing with the injected chemical agent enhanced as hereinafter explained.

Enhancement of such in-situ cleansing to a necessary extent involves supply of pressurized air to the upper tray/tank air sparging array 48 via tank penetration opening 52 and to the lower tank air sparging array 44 via a flanged opening. Supply of pressurized air to the both internal 50-gpm oil/water separator air sparging array 44 and 48 is provided by some ship service source at a flow of 23 to 25 standard cubic feet per minute and 91 to 95 pounds per square inch gauge pressure. The upper tray/tank air sparging array 48 contains a main header with six air feeder branches. The following table details port hole sizes in each branch.

| Branch | Port Hole Sizes in Inches |
| --- | --- |
| 1 | 0.1065 |
| 2 | 0.1065 |
| 3 | 0.089 |
| 4 | 0.089 |
| 5 | 0.089 |
| 6 | 0.089 |

The lower tank air sparging array 44 consists of a header with eight branches forming four-two legged branches symmetric about the header. All port hole sizes in the lower tank array 44 are 0.0935 inches. Both arrays lie below the upper tray/tank and lower tanks plate packs. Air introduced into the arrays 48 and 44 thus agitates and distributes the introduced cleaning agent and thus enhances in-situ process.

Based on the foregoing description of the components associated with the separator 10, the following functional phases of operation may be performed.

(1) The separator 10 is initially conditioned through the manual valves 58, 100, 102, 104, 106 and 124 for the oil/water separation process.

(2) Bilge wastewater is then introduced into the upper separator tank section 26 through the inlet fitting 28 by the valve 56.

(3) Oil/water separation is then performed by sequential passage of the wastewater through the plate packs 46 and 42 in the upper and lower tank sections 26 and 14.

(4) Separated oil in the upper tank section 26 then enters the oil tower 38 and is drained therefrom respectively through the valves 76 and 78 into the waste oil holding tank 80 and the drain 84.

(5) During such drainage of the oil, air is expelled from the oil tower 38 through the air eliminator 94 and the check valve 96 into the drain 84.

(6) Clean water effluent separated and collected within the lower tank section 14 emerges therefrom through the outlet pipe 32 and the valves 128 and 112 under the action of the pumps 108 and 110 into the drain 84.

(7) During the foregoing referred to oil/water separation process, fresh water is introduced through the valves 64, 66 and 68 and fed through the valve 100 into the drain 84, and through the valves 72, 70, 74, 128, 112 and the pumps 108 and 110 is supplied to the valve 116 for either effluent treatment or overboard discharge.

(8) After the foregoing oil/water separation process is repeated to a preselected extent, separator operation is shut down by the controller 146 pursuant to conditions reflected by the sensors 91 and 130, followed by selective conditioning of the separator 10 by control of the valve 132 for tank back-flush with fresh water and the enhanced in-situ cleansing of the plate stacks 42 and 46 as hereinbefore described.

Obviously, other modifications and variations of the present invention may be possible in light of the foregoing teachings. It is therefore to be understood that within the scope of the appended claims the invention may be practiced otherwise than as specifically described.

What is claimed is:

1. An oil and water separator apparatus comprising:
  an upper tank;
  a lower tank, the lower tank positioned adjacent to the upper tank;
  an inlet for the intake of oily wastewater;
  an outlet for the outflow of clean effluent, the outlet positioned opposite to the inlet;
  a plurality of upper tank plates, the upper tank plates positioned in the upper tank;
  a plurality of lower tank plates, the lower tank plates positioned in the lower tank, the upper and lower tank plates providing separation treatment for oily wastewater;
  upper air sparging array means situated below the upper tank and adjacent to the lower tank for performance of separation treatment;
  lower air sparing array means situated below the lower tank for the performance of separation treatment;
  means for enhancing in-situ cleansing of the upper and lower tank plates contaminated by exposure to the oily wastewater during said separation treatment, comprising:
    a main flow header; and
    means for positioning the upper and lower air sparging array means with a plurality of flow distributing branches connected thereto on the main flow header,
  air emergence means on the main flow header for outflow of pressurized air therefrom within the separator at plural locations therein below the plates; and
  means for injecting a chemical cleaning agent via a valved piping means, into said upper and lower tanks for cleaning said plates, wherein the upper and lower air sparing array means agitates and distributes the injected chemical cleaning agent.

2. The apparatus as defined in claim 1, wherein the upper air sparging array means, the lower air sparging array means and the valved piping means are dimensioned to handle 50 grams per minute of oily wastewater, and to provide pressurized air at a flow of 23 to 25 standard cubic feet per minute and at 91 to 95 pounds per square inch gage pressure.

3. The apparatus as defined in claim 1, wherein each of the air emergence means respectively associated with the flow distributing branches has plural bubble ports laterally spaced from the main flow header.

4. The apparatus as defined in claim 1, wherein the means for positioning the upper and lower air sparging array means includes at least six air feeder branches associated with the upper air sparging array means, and at least eight air feeder branches associated with the lower air sparging means.

5. The apparatus as defined in claim 4, wherein the at least six air feeder branches associated with the upper air sparging array means have port holes that vary in size.

6. The apparatus as defined in claim 5, wherein each of the at least six air feeder branches associated with the upper air sparging array means have a port hole size of about 0.089 inches or about 0.1065 inches.

7. The apparatus as defined in claim 5, wherein each of the at least eight air feeder branches associated with the lower air sparging array means have port hole sizes of about 0.0935 inches.

* * * * *